3,758,270
COLORING NICKEL MODIFIED OLEFINIC POLYMERS WITH AN AROMATIC ORTHOHYDROXY CARBOXYLIC ACID AND AZO PIGMENT, PRINT PASTE COMPOSITION AND FIBERS COLORED THEREBY
Harold C. Will, Reading, Pa., assignor to Crompton & Knowles Corporation, Worcester, Mass.
No Drawing. Filed Oct. 5, 1970, Ser. No. 78,173
Int. Cl. C09b 45/22; D06p 1/18
U.S. Cl. 8—42 D    15 Claims

ABSTRACT OF THE DISCLOSURE

Compositions coloring for nickel stabilized olefinic polymers comprising an aromatic orthohydroxy carboxylic acid and a compound having the structure—

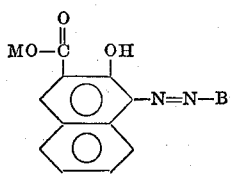

wherein M is —H, —K, —Na, —½ Ca, —½ Mg, —½ Mn or —½ Ba and B is an azo coupling component free of groups such as —$SO_3H$, —COOH, —OH, and —$OCH_3$, or combinations of substituent groups which impart water solubility of the order provided by such groups. Other aspects of the disclosure deal with a coloring process suing the composition, to the colored fibers produced by the process and to a print paste which employ the composition.

---

This invention relates to a composition and to a process using the composition to color (using either dyeing or printing techniques) nickel containing olefinic polymers such as polypropylene. The invention also relates to colored polymers so obtained.

The application of Russell I. Steiner (Ser. No. 62,196 filed Aug. 7, 1970, now abandoned, and owned by the assignee of this application) is directed, inter alia, to a process for coloring the nickel containing olefinic polymers contacted with an aqueous system carrying a compound having the structure—

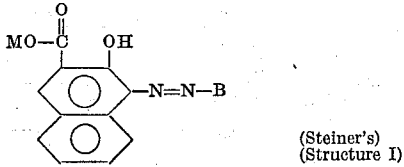
(Steiner's)
(Structure I)

wherein M is —H, —K, —Na, —½ Ca, —½ Mg, —½ Mn or —½ Ba and B is an azo coupling component free of groups such as —$SO_3H$, —COOH, —OH, and —$OCH_3$, or combinations of substituent groups which impart water solubility of the order provided by such groups; for example the azo coupling component provided by an aniline having the structure

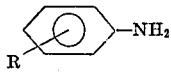

where R is —H, an alkyl group having from 1 to 12 carbons or a halogen.

In many instances, the color components for use in accordance with the aforesaid Steiner application are commercially available as the so-called BON pigments. However, this application and the Steiner application are not to be strictly limited to the use of known BON pigments since many other compounds having the specified structure are operative as coloring agents for the nickel containing olefinic polymers—particularly the polypropylene textile fibers sold under the trademarks VECTRA (Enjay), HERCULON (Hercules), and MARVESS (Phillips). A common characteristic of such polymers being the inclusion therein of minor amounts of nickel as a stabilizer, for example the residues provided by organonickel complexes, nickel salts of carboxylic acids, or bisphenol nickel derivatives and the like.

The present invention is a modification and improvement of the invention disclosed in the aforesaid Steiner application, in that the present invention contemplates the coloring of nickel stabilized olefinic polymers with the Structure I compounds of Steiner, and therefore the disclosure of the Steiner application is incorporated herein by reference.

In accordance with this invention, it has been found that if an aromatic orthohydroxy carboxylic acid (hereinafter sometimes referred to as the carboxylic acid component) is applied from an aqueous system to the nickel modified polyolefinic polymer together with a Steiner Structures I compound (hereinafter sometimes referred to as the coloring component), it causes a bathochromic shift and results in a clearer and brighter color having enhanced light-fastness over that obtained if the carboxylic acid component is not present.

In general, there are benefits obtained where the carboxylic acid component is present in quantities greater than the color component. In practice, from 2 to 12 parts by weight of the carboxylic acid component can be effectively used in combination with 1 part by weight of the color component and optimum benefits will be obtained with 1 part color and 3 to 6 parts of the acid.

The aromatic orthohydroxy carboxylic acids that are useful for the purposes of this invention always contain a single hydroxy ortho to the carboxyl group and include the o-hydroxybenzoic acids such as salicyclic acid, o-cresotinic acid, and 5-chloro salicylic acid, and the o-hydroxy napthoic acids such as 3-hydroxy-2-naphthoic acid and 1-hydroxy-2-naphthoic acid. Salicylic acid is the preferred acidic component because when it is used in combination with a Steiner Structure I color component, it is relatively inexpensive and gives excellent brightening and it enhances the lightfastness strikingly.

The manipulative steps used to color the olefinic polymers in accordance with this invention are the well known and conventional operations used in the dyeing of textiles with dispersed dyes or in the printing of textiles with color containing pastes. However, in either case and in order to prepare the Steiner Structure I compounds in a form suitable for incorporation in print pastes or other aqueous dispersions, about 20 to 50 parts of the color concentrate are ground with about 80 to 50 parts of a dispersing agent (e.g., sodium lignosulfonate) in a sand/water media to an average particle size of about 10 microns. The ground color is screened to remove the sand and then spray dried at about 110 degrees C. to 165 degrees C. This product is hereinafter referred to as the "dispersed dye."

The compositions of this invention can be formed in situ in the print paste or dye bath by adding the acidic and color components either simultaneously or separately in quantities needed to give the proper ratio of acid to color. When added simultaneously, the "acid" and "color" are intimately admixed by milling 1 part by weight of the coloring component (i.e. in the "dispersed dye" form containing 1 part color) with from 2 to 12 parts by weight of the carboxylic acid component. This admixture can be readily blended either in the dye bath or in print paste formulations that contain water and a thickener; print pastes may also contain conventional printing auxiliaries such as dispersants, organic solvents, activators, sequestering agents, anti-foaming agents, and the like.

In coloring olefinic polymers in accordance with this invention, it is preferred that the pH of the dyebath or of the print paste be below 5 and preferably between 2 and 3.5. If the quantity of the specified carboxylic acid component used is insufficient to establish the desired pH, a stronger acid such as citric acid can be added to boost the acidity to the desired level without detrimental effect.

The following examples will serve to illustrate the invention. In these examples, unless otherwise indicated, parts are by weight, temperatures are expressed as degrees Centigrade and percentages are percentages by weight.

EXAMPLE I (PRINTING)

A stock thickener was prepared by slowly admixing (in the listed sequence and with vigorous agitation) the following:

| | Parts |
|---|---|
| Cold water | 635 |
| 2-ethyl-hexanol | 10 |
| Tetra sodium salt of ethylene diamine tetra acetic acid | 5 |
| "Kelzan" (a thixotropic polysaccharide gum thickener) | 10 | after gelling

| | |
|---|---|
| "Cibaphasol" AS (a sulfate ester anionic dispersant) | 10 |
| Cindye DAC 888" (a butyl benzoate type carrier) | 30 |
| | 700 |

The "Color Mix" used was an admixture of 1 part dispersed color (i.e. 0.3 part D&C Red 31 and 0.7 dispersant) and 2 parts salicylic acid.

D&C Red 31 is the calcium salt of a Steiner Structure I dye in which B is phenyl.

A print paste was prepared by admixing—

| | Parts |
|---|---|
| "Color Mix" | 3 |
| Hot water | 25 |
| Stock thickener (about described) | 70 |
| Citric acid | 2 |
| Total | 700 |

The paste described was struck off on a nickel modified polypropylene needle punch carpet fabric using an open mesh screen and a squeegee. The printed fabric, without drying was steamed for 10 minutes with saturated steam atmospheric pressure. The steamed fabric was flushed with running cold water, nipped and scoured with soda ash and detergent, nipped, rinsed cold, nipped, extracted and air dried at 240° F. (maximum) without overdrying. The printed fabric was an exceptionally bright scarlet of excellent light fastness and dry cleaning fastness.

EXAMPLE II

Substitution of a Steiner Structure I dye in which B is parabutylphenyl for the D&C Red 31 in the foregoing example produced comparable results but in a bright red shade.

I claim:
1. A composition comprising from 2 to 12 parts by weight of an aromatic orthomonohydroxy carboxylic acid and 1 part by weight of a compound having the structure

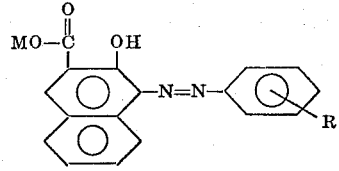

wherein M is —H, —Na, —K, —½ Ca, —½ Mg, —½ Mn or ½Ba and R is —H, an alkyl group having 1 to 12 carbons or a halogen group.

2. A composition according to claim 1 wherein the aromatic orthomonohydroxy carboxylic acid is an o-hydroxybenzoic acid or an o-hydroxynaphthoic acid.

3. A composition according to claim 1 wherein the aromatic orthomonohydroxy carboxylic acid is 3-hydroxy-2-naphthoic acid.

4. A composition according to claim 1 wherein the aromatic orthomonohydroxy carboxylic acid is salicylic acid.

5. A composition according to claim 1 where the R group is positioned para to the azo linkage and is —H or an alkyl group.

6. A composition according to claim 5 wherein R is —H.

7. A composition according to claim 5 wherein R is —C$_4$H$_9$.

8. A process of coloring nickel stabilized olefinic polymers which comprises dying or printing the polymer with an aqueous dispersion of a composition according to claim 14.

9. A process according to claim 8 wherein the pH of the system is below 5.

10. Nickel stabilized polypropylene fibers colored by the process of claim 8.

11. A print paste containing water, a thickener and a composition according to claim 1.

12. A print paste according to claim 11 wherein the pH of the paste is below 5.

13. Nickel stabilized polypropylene fibers colored by the process of claim 9.

14. A process acording to claim 8 wherein the pH of the system is between 2.0 and 3.5.

15. A print paste according to claim 11 wherein the pH and the paste is between 2.0 and 3.5.

References Cited
UNITED STATES PATENTS

| 3,321,266 | 5/1967 | Wunderlich et al. | 8—42 |
| 3,332,732 | 7/1967 | Karoly | 8—42 |
| 3,316,054 | 4/1967 | Tsunoda et al. | 8—100 |

FOREIGN PATENTS

| 935,125 | 8/1963 | Great Britain | 8—180 |

GEORGE F. LESMES, Primary Examiner

P. C. IVES, Assistant Examiner

U.S. Cl. X.R.

8—62, 180

UNITED STATES PATENT OFFICE
CERTIFICATE OF CORRECTION

Patent No. 3,758,270          Dated September 11, 1973

Inventor(s) Harold C. Will

It is certified that error appears in the above-identified patent and that said Letters Patent are hereby corrected as shown below:

In Column 1, line 31 change "suing" to --using--

In Column 2, lines 37 and 38, change "o" to --o--

In Column 3, line 34, change "700" to --690--

In Column 3, line 44, change "about" to --above--

In column 3, line 47, change "700" to --100--

In Column 4, line 33, change "14" to --1--

Signed and sealed this 16th day of July 1974.

(SEAL)
Attest:

McCOY M. GIBSON, JR.          C. MARSHALL DANN
Attesting Officer             Commissioner of Patents